(12) United States Patent
Sugimoto et al.

(10) Patent No.: US 12,102,995 B2
(45) Date of Patent: Oct. 1, 2024

(54) NOZZLE, SOLID MATTER UNLOADING DEVICE, SOLID MATTER UNLOADING SYSTEM, AND SOLID MATTER UNLOADING METHOD

(71) Applicant: NIPPON SHOKUBAI CO., LTD., Osaka (JP)

(72) Inventors: Takashi Sugimoto, Himeji (JP); Hajime Gamma, Himeji (JP); Hiromi Yunoki, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 651 days.

(21) Appl. No.: 17/422,920

(22) PCT Filed: Jan. 8, 2020

(86) PCT No.: PCT/JP2020/000322
§ 371 (c)(1),
(2) Date: Jul. 14, 2021

(87) PCT Pub. No.: WO2020/153127
PCT Pub. Date: Jul. 30, 2020

(65) Prior Publication Data
US 2022/0088554 A1  Mar. 24, 2022

(30) Foreign Application Priority Data

Jan. 25, 2019 (JP) .................................. 2019-011467

(51) Int. Cl.
*B01J 8/00* (2006.01)
*B01J 4/00* (2006.01)
(Continued)

(52) U.S. Cl.
CPC ............... *B01J 8/004* (2013.01); *B01J 4/002* (2013.01); *B01J 4/008* (2013.01); *B01J 8/06* (2013.01);
(Continued)

(58) Field of Classification Search
CPC ... B01J 8/002; B01J 8/003; B01J 8/004; B01J 8/06; B01J 2208/00752; B01J 2208/00761; B01J 2208/00769
See application file for complete search history.

(56) References Cited

U.S. PATENT DOCUMENTS 5,222,533 A   6/1993   Porter, Jr.
5,228,484 A   7/1993   Johnson
(Continued)

FOREIGN PATENT DOCUMENTS

GB   1299292 A   2/1970
GB   2173122 A   10/1986
(Continued)

OTHER PUBLICATIONS

Office Action for the corresponding Chinese Patent Application No. 202080008040.4, dated Aug. 3, 2022, with English translation.
(Continued)

*Primary Examiner* — Lessanework Seifu
(74) *Attorney, Agent, or Firm* — LUCAS & MERCANTI, LLP

(57) ABSTRACT

A nozzle includes: a flow path allowing gas to flow; tip opening portion(s) formed on a tip side of the flow path; a base end opening portion formed on a base end side of the flow path; and side hole(s) which is formed on the base end side from the tip opening portion and allows a part of the gas flowing through the flow path to be discharged toward the base end side. The tip opening portion(s) is formed in a direction of the flow path. The side hole(s) is formed along
(Continued)

a circumferential direction of the flow path. When the gas is supplied from the base end opening portion, a ratio (Q1a/Q1b) of a flow rate (Q1a) of the gas discharged from the tip opening portion(s) and a flow rate (Q1b) of the gas discharged from the side hole(s) is 0.05 to 0.7.

12 Claims, 9 Drawing Sheets

(51) Int. Cl.
  *B01J 8/06* (2006.01)
  *B05B 1/00* (2006.01)
  *B05B 1/14* (2006.01)
  *B05B 1/30* (2006.01)
(52) U.S. Cl.
  CPC ............... *B05B 1/005* (2013.01); *B05B 1/14* (2013.01); *B05B 1/30* (2013.01); *B01J 2208/00761* (2013.01)

(56) References Cited

U.S. PATENT DOCUMENTS

| | | | |
|---|---|---|---|
| 2009/0112367 A1* | 4/2009 | DeCourcy | B01J 8/0045 241/38 |
| 2014/0290788 A1 | 10/2014 | Dupont et al. | |

FOREIGN PATENT DOCUMENTS

| | | | |
|---|---|---|---|
| JP | S4938428 B1 | 10/1974 | |
| JP | H11-130722 A | 5/1999 | |
| JP | 2002301355 A | 10/2002 | |
| JP | 2007090215 A | 4/2007 | |
| WO | 1998/002239 A1 | 1/1998 | |
| WO | 2008/076751 A2 | 6/2008 | |
| WO | WO-2019016327 A1 * | 1/2019 | ............ B01J 8/0015 |

OTHER PUBLICATIONS

Office Action dated Nov. 29, 2022 for the corresponding Japanese patent application No. 2020-568057, with English translation.
Office Action dated Dec. 7, 2022 for the corresponding Korean patent application No. 10-2021-7021033, with English translation.
Office Action dated Aug. 4, 2023 for the corresponding European Patent Application No. 20745521.3.
EPO, Extended European Search Report for the corresponding European patent application No. 20745521.3, dated Jan. 5, 2022.
Office Action dated Jun. 27, 2023 for the corresponding Korean Patent Application No. 10-2021-7021033, with English translation.
JPO, Office Action for the corresponding Japanese patent application No. 2020-568057, dated Jul. 5, 2022, with English translation.
International Search Report for the corresponding patent application No. PCT/JP2020/000322 dated Mar. 24, 2020 with English translation.
Written Opinion of the International Searching Authority for the corresponding patent application No. PCT/JP2020/000322, dated Mar. 24, 2020 (English translation not available).
Office Action dated Feb. 11, 2023 for the corresponding Chinese patent application No. 202080008040.4, with English translation.

* cited by examiner

[FIG. 1]
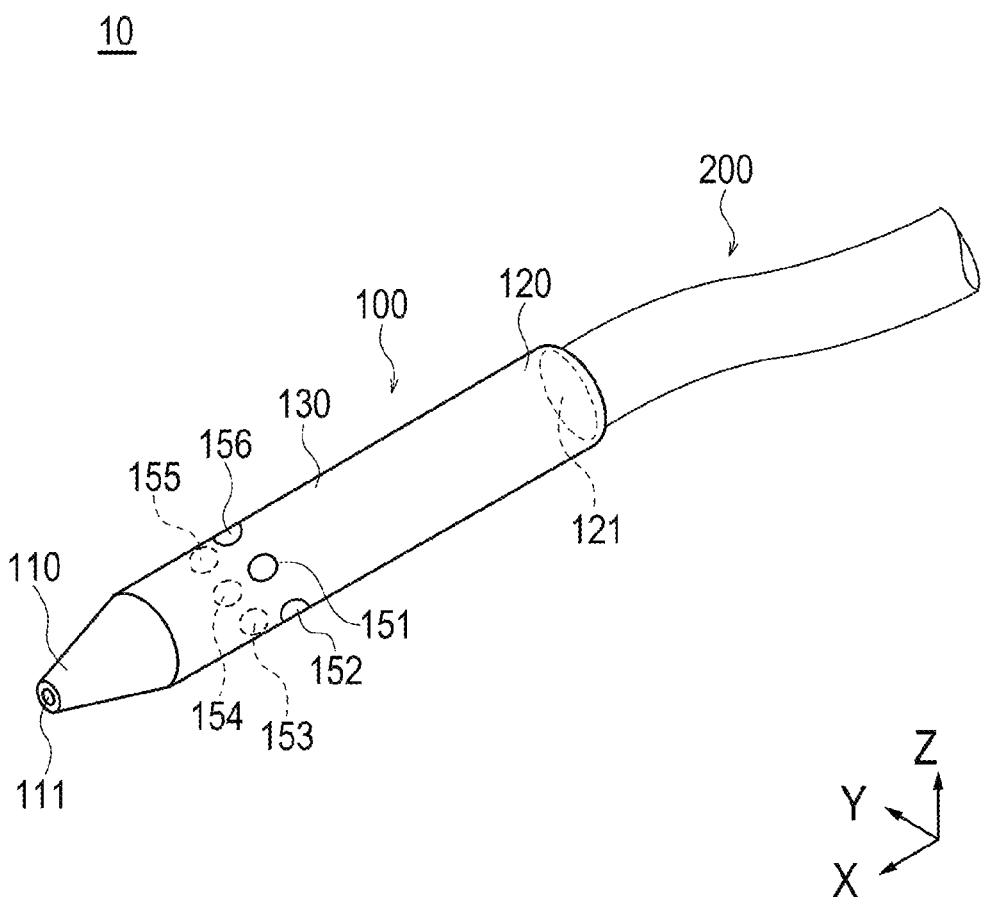

[FIG. 2]
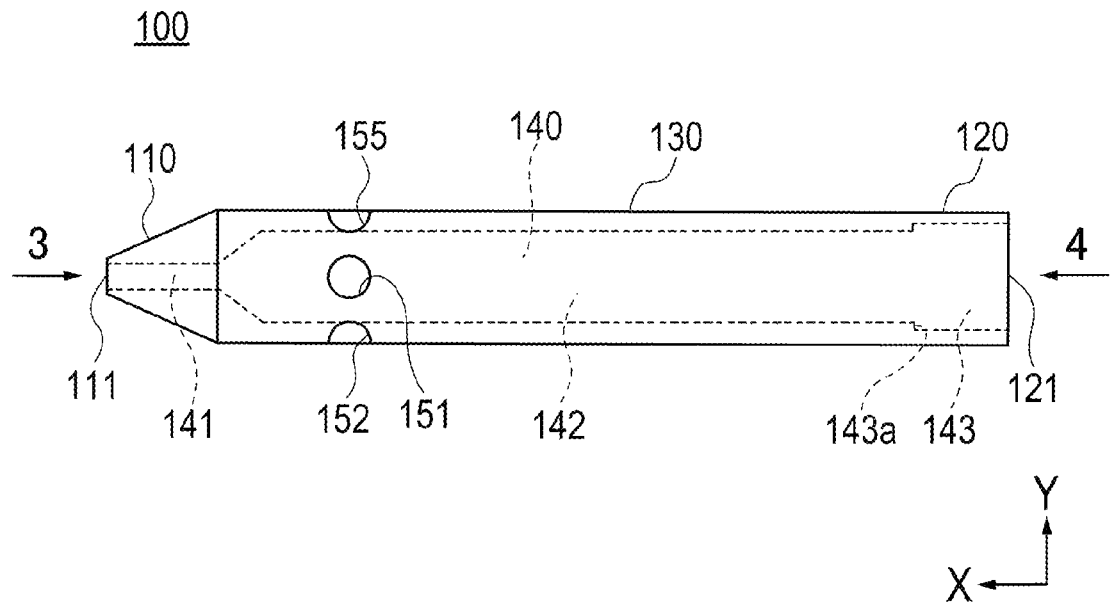
[FIG. 3]
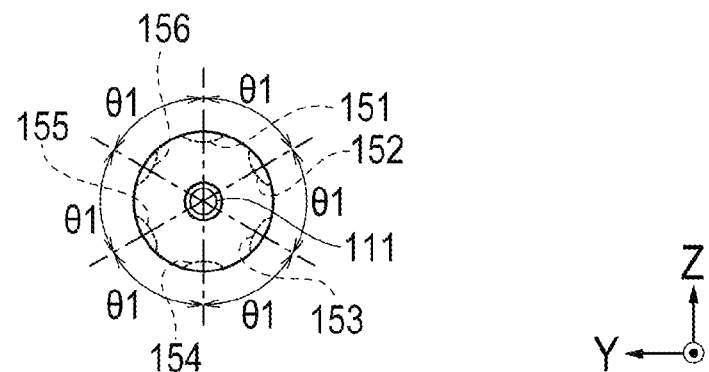
[FIG. 4]
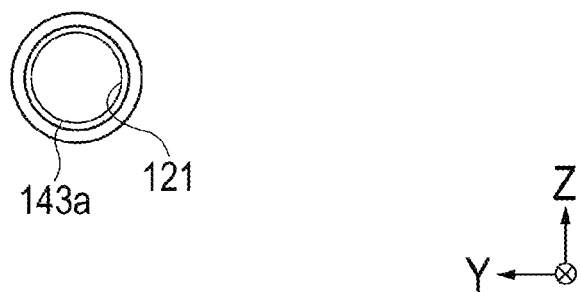

[FIG. 5]
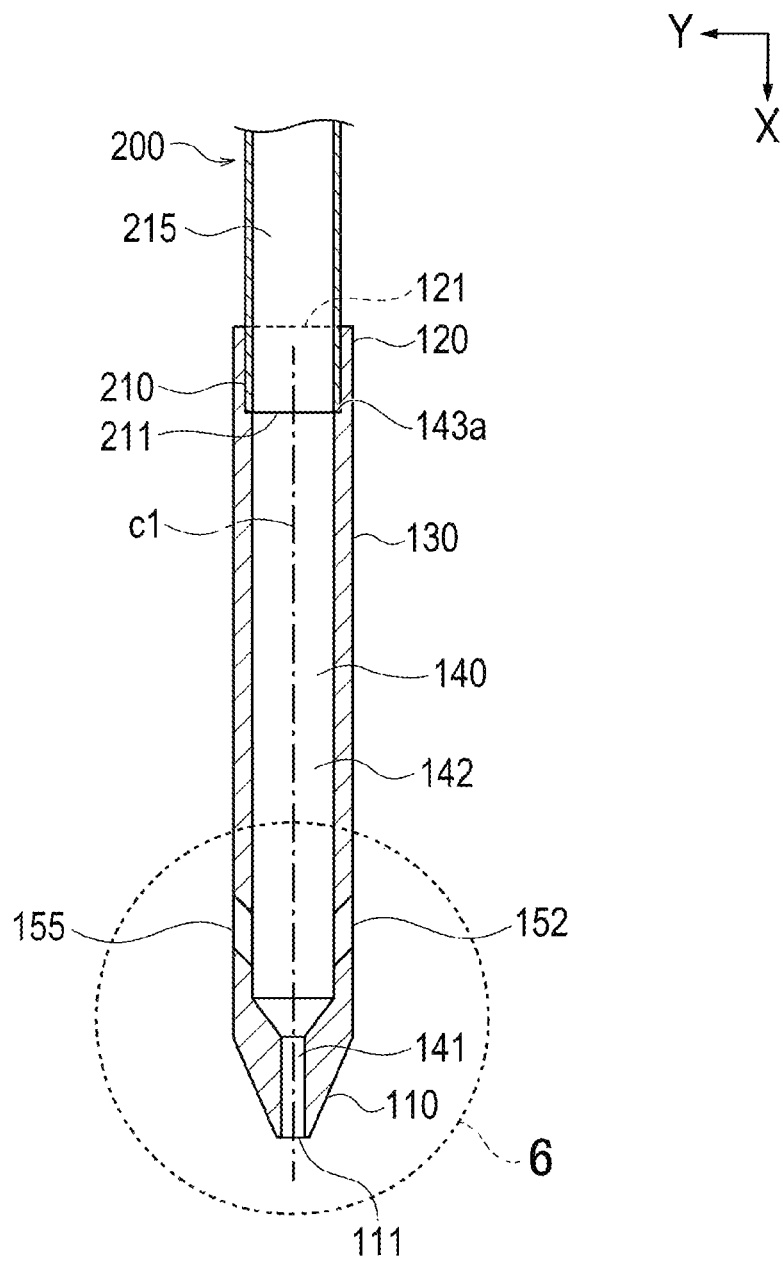

[FIG. 6]
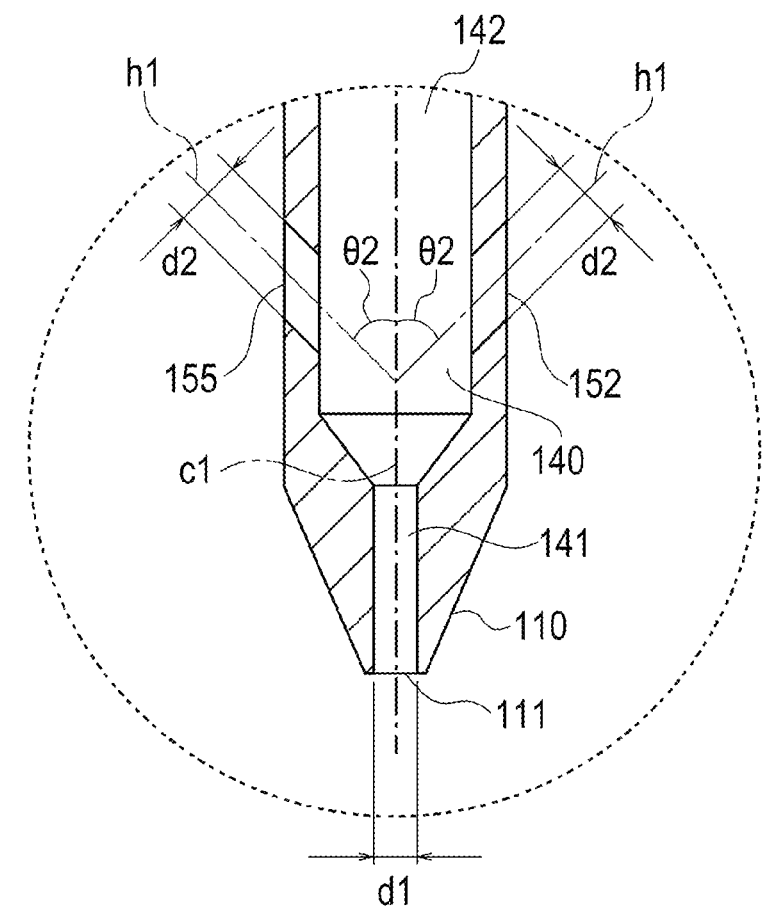
[FIG. 7]
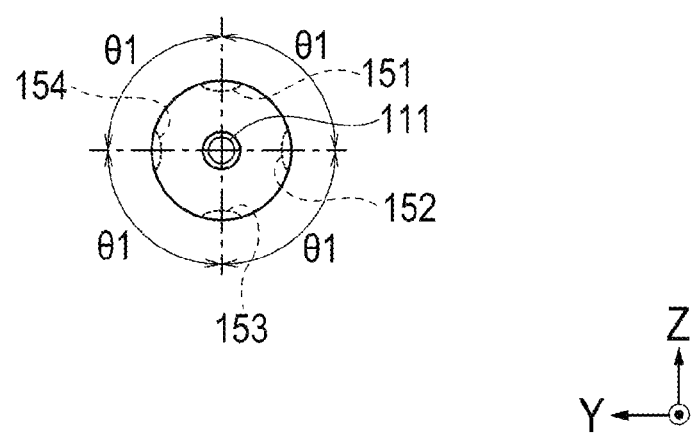

[FIG. 8]
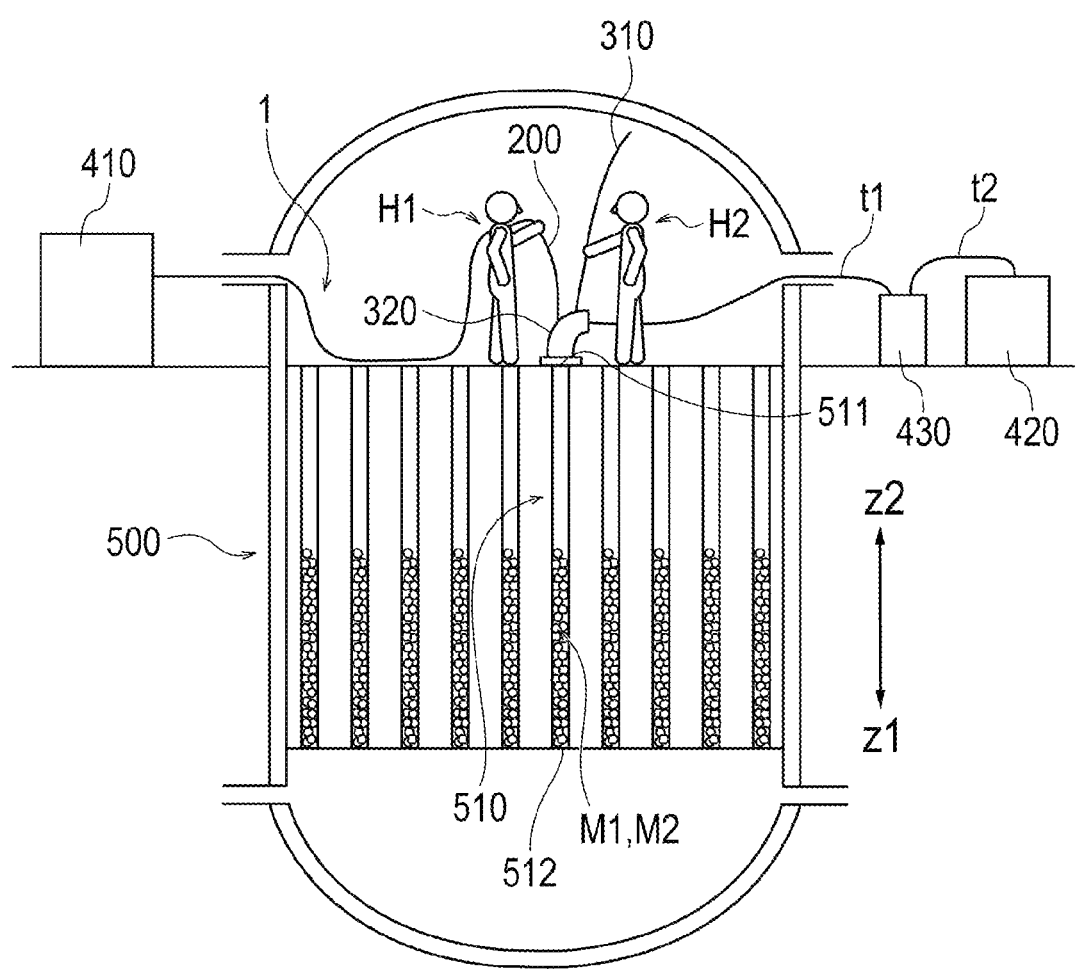

[FIG. 9]
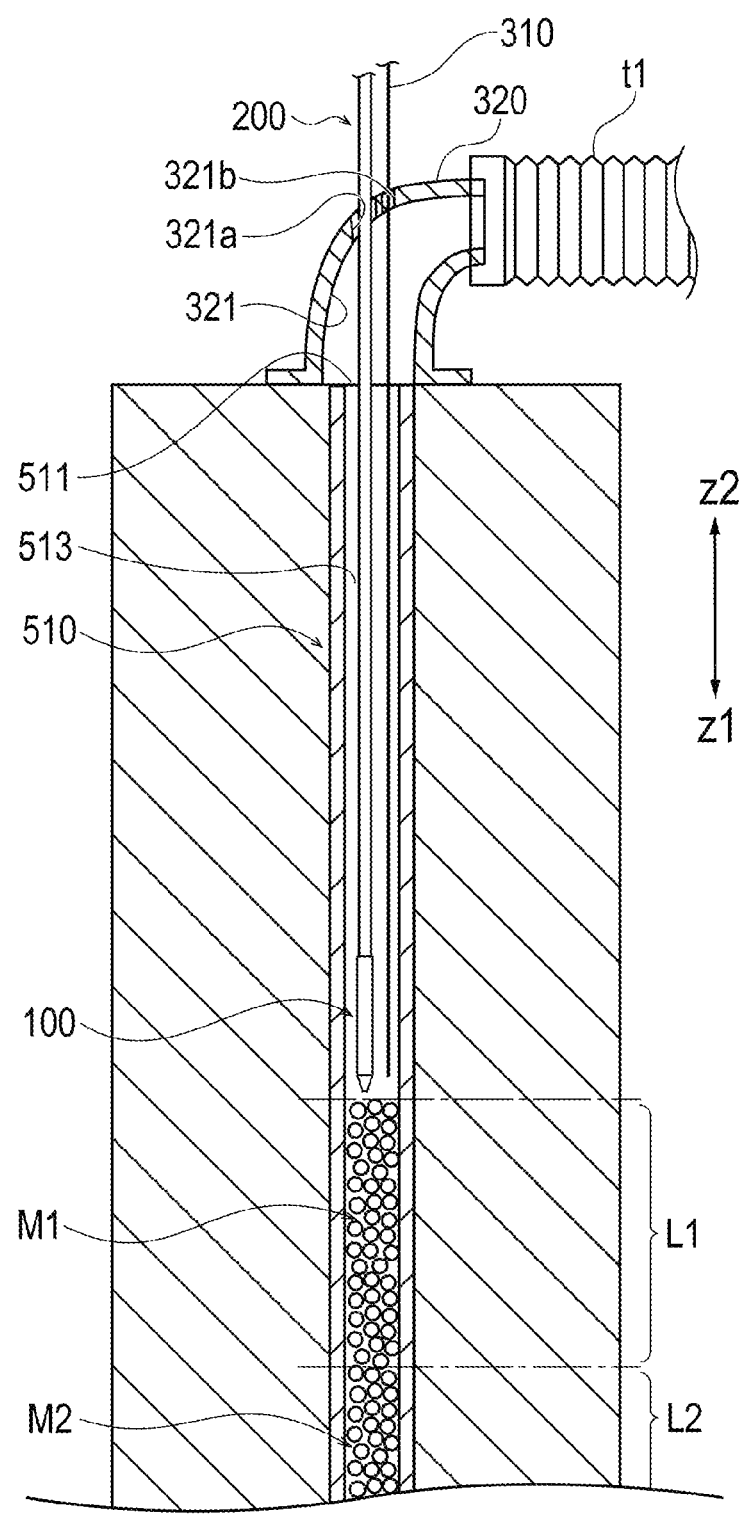

[FIG. 10]
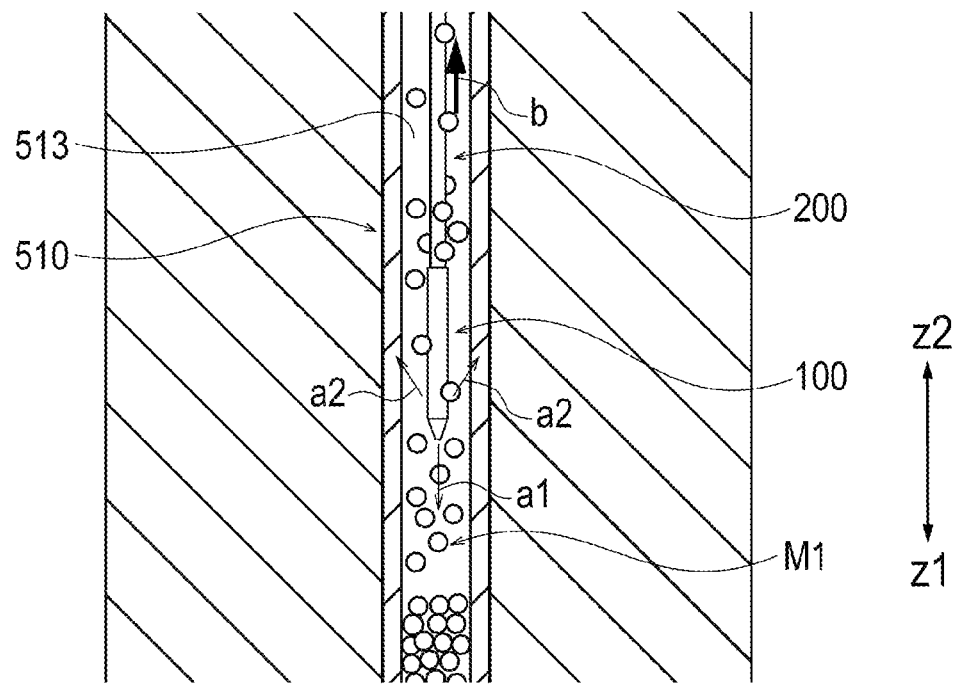
[FIG. 11]
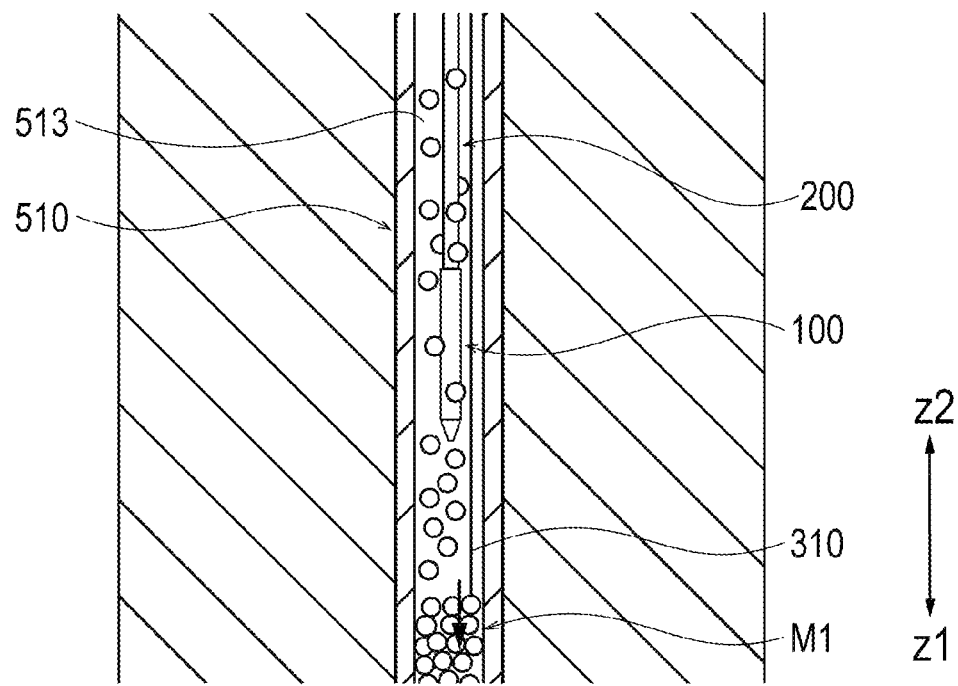

[FIG. 12]
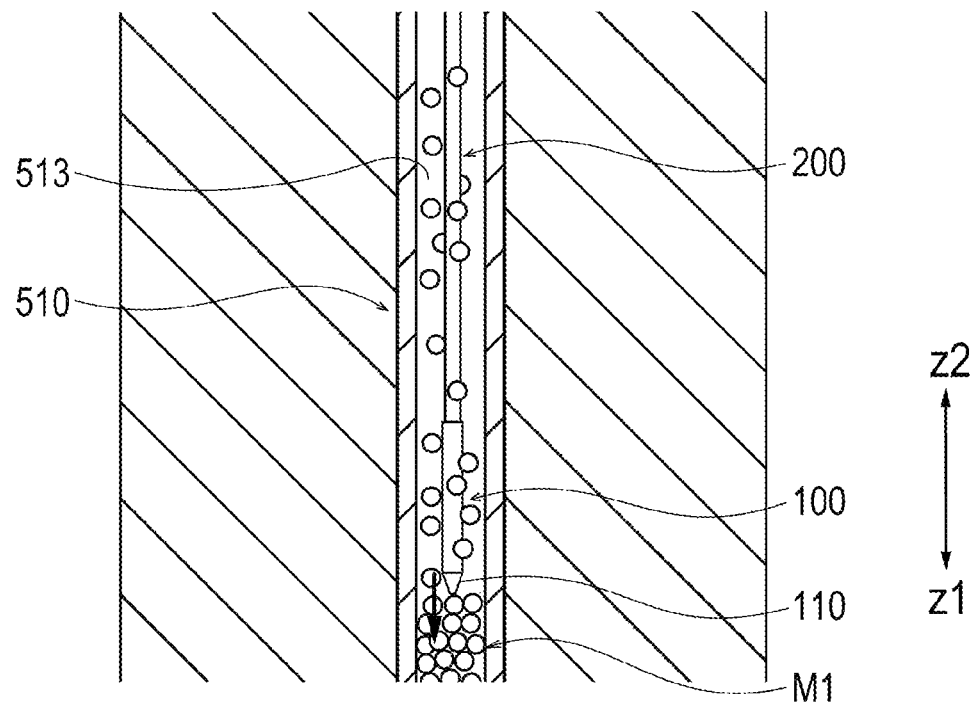
[FIG. 13]
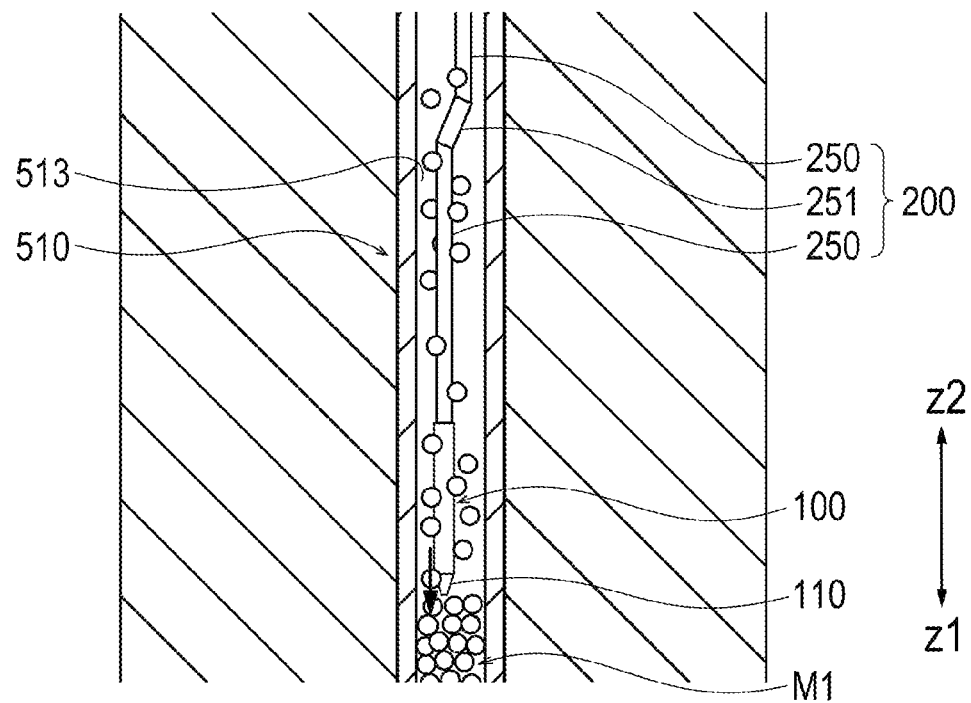

[FIG. 14]
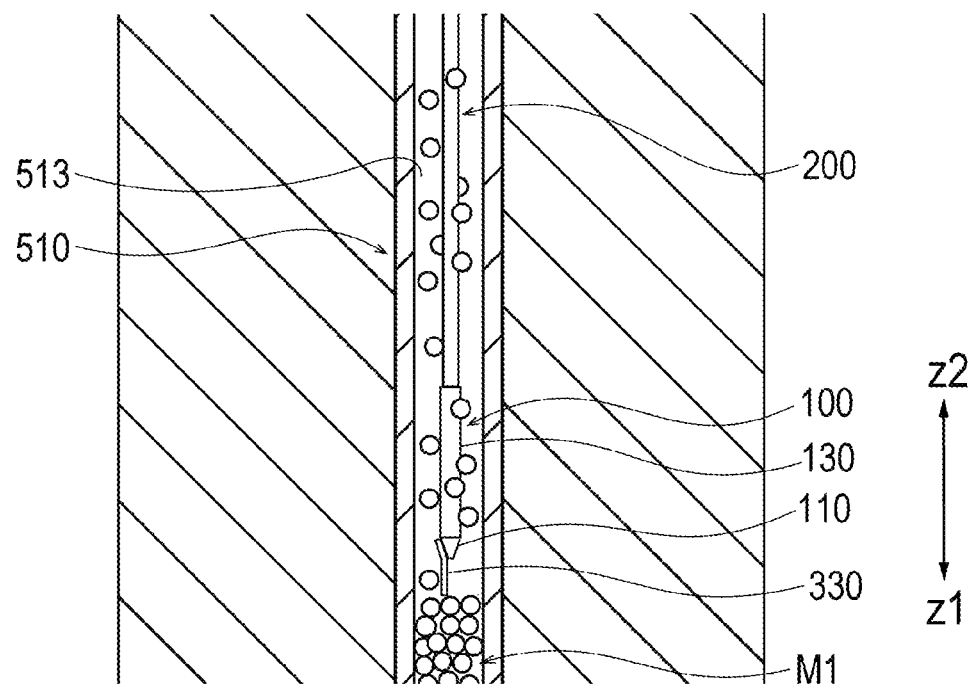

NOZZLE, SOLID MATTER UNLOADING DEVICE, SOLID MATTER UNLOADING SYSTEM, AND SOLID MATTER UNLOADING METHOD

CROSS REFERENCE TO RELATED APPLICATION

This Application is a 371 of PCT/JP2020/000322 filed on Jan. 8, 2020 which, in turn, claimed the priority of Japanese Patent Application No. 2019-011467 filed on Jan. 25, 2019, both applications are incorporated herein by reference.

TECHNICAL FIELD

The present invention relates to a nozzle used for unloading granular solid matter filled in a tubular body such as a reaction tube of a multi-tube reactor, a solid matter unloading device, a solid matter unloading system, and a solid matter unloading method.

BACKGROUND ART

In the field of petrochemical industry, many catalytic reaction, which uses a tubular reactor, such as decomposition reaction, reforming reaction, oxidation reaction, ammoxidation reaction, and reduction reaction of hydrocarbons are carried out. The reactors used for these reactions are equipped with thousands to ten thousands of reaction tubes (hereinafter sometimes referred to as "tubular bodies"), and the reaction tubes are filled with granular solid matters such as catalysts or inert substances suitable for each catalytic reaction (hereinafter, the granular solid matters such as catalysts filled inside the tubular body are sometimes referred to as "packing materials"). For example, in Patent Literature 1, disclosed is a method in which a packing layer of inert substances is provided between a layer filled with a first-stage reaction catalyst containing molybdenum, bismuth and iron as essential constituents and a layer filled with a second-stage reaction catalyst containing molybdenum and vanadium as essential constituents, and acrylic acid is synthesized from propylene by a two-stages catalytic gas phase oxidation reaction using a single heat exchange type multi-tube reactor.

When a packing material such as a catalysts used in these catalytic reaction is used for a long period of time in a chemical plant, a catalytic function such as activity and selectivity is impaired due to poisoning, coking, sintering, or the like, a mechanical strength deteriorates, or a pressure loss increases, so that the stable and efficient operation of the plant cannot be performed. Therefore, solid matters such as catalysts of which a performance or the like deteriorates are unloaded from a tubular body in order to replace the solid matter with another new catalyst or the like. Further, also in the case of repairing or inspecting a reactor, a tubular body, or the like, work of unloading the solid matter such as catalysts from the tubular body may be carried out.

As a method for unloading these solid matters such as catalysts from the tubular body in the reactor, for example, a method using an opening portion formed at the lower end of the tubular body is known. In this method, a worker enters the inside of the reactor, inserts a rod-shaped member or the like through the opening portion formed at the lower end of the tubular body, and pushes up packing materials such as catalysts to cause the solid matters inside the tubular body to drop with loosening.

In the above method, every time the worker pushes up with a rod-shaped member, the solid matters such as catalysts filled inside the tubular body or the crushed materials thereof drop to fall onto the worker. Further, in the work place, a large amount of dust is generated so that an environment becomes poor, and thus it is inevitable for the worker to wear dustproof clothes, dust masks, goggles, gloves and the like. As described above, the unloading work by the above method is not a preferable method from the viewpoint of efficiency and hygiene.

In the method described in Patent Literature 2, in consideration of the above problems, for example, as a first embodiment, a work procedure is adopted in which a suction force is generated by a suction hose inserted inside the tubular body to unload solid matters through the opening portion formed at the upper end of the tubular body. Further, as a second embodiment, in order to unload the solid matters more efficiently, a work procedure is adopted in which the packing material inside the tubular body is fluidized and unloaded when a gas such as air is discharged toward the solid matters from an ejection tube inserted inside the tubular body while the suction force is generated inside the tubular body.

The above method can improve the work efficiency as compared with the method in which the worker manually unloads the packing material through the opening portion formed at the lower end of the tubular body. Further, the packing material sucked up to the upper end side of the tubular body by the suction hose can be sent directly to a collection container or a pump vehicle, so that the packing material does not fall on the worker. Thus, an improvement in hygiene can be made.

CITATION LIST

Patent Literatures

Patent Literature 1: JP 11-130722 A
Patent Literature 2: JP 2007-90215 A

SUMMARY OF INVENTION

Technical Problem

However, for example, in the method described as the second embodiment in Patent Literature 2, the following points are raised as problems.

When a gas is discharged toward the solid matters such as catalysts filled in the tubular body, and a discharge amount (blowing amount) of the gas is excessively large, a large amount of solid matters flow due to the gas blowing, and the solid matters are drifted up to the upper end side of the tubular body at once. As a result, a secondary blockage (bridge) in which the solid matters are caught between the gas discharge hose or ejection tube inserted inside the tubular body and the inner wall of the reaction tube easily occurs, and a process is needed which interrupts the unloading work each time to remove the blockage. Thus, the efficiency of the unloading work is rather reduced. Further, since a large amount of solid matters are unloaded at once, even solid matters which do not need to be unloaded are unloaded, and thus the accuracy of the unloading amount is lowered.

On the other hand, when the amount of gas discharged toward the solid matters filled in the tubular body is excessively small, the solid matters in the tubular body become difficult to flow, an amount of drifting up the solid matters toward the opening portion formed at the upper end of the tubular body is reduced, and an unloading efficiency is reduced. Further, in a case where the gas discharge amount is extremely small, the solid matters may not move to the upper end of the tubular body and may not be unloaded at all. In this case, in order to move the solid matters toward the opening portion formed at the upper end of the tubular body, it becomes necessary to generate an extremely large suction force inside the tubular body. However, when an excessively large suction force is generated, an upflow of gas is generated from the opening side of the lower end of the tubular body toward the upper end side of the tubular body, and the solid matters flow toward the upper end side of the tubular body. Therefore, in a case where different types of solid matters are filled in layers inside the tubular body as described in Patent Literature 1, when only the solid matters filled on the upper layer side are unloaded selectively, and the flow of the solid matters is made due to the upflow of the gas as described above, there is a possibility that the solid matters filled in the upper layer side and the solid matters filled in the lower layer side are unloaded together.

As described above, in the work of unloading granular solid matters from the tubular body as described in Patent Literature 2, in a case where a method of discharging the gas toward the solid matters is adopted, when the settings of a blowing-out amount or a suction amount of gas for moving the solid matters to the upper end side of the tubular body while flowing are not adjusted appropriately, as a result the work efficiency may be reduced and even solid matters which are not required to be unloaded originally may be unloaded so that the reduction in unloading accuracy occurs.

In view of the related art regarding the solid matter unloading method, the present inventors completes the present invention based on the idea that the above-described problems can be solved by appropriately adjusting, when the solid matters inside the tubular body is caused to flow by discharging the gas through the ejection tube inserted into the tubular body toward the solid matters in the method of unloading solid matters as described in the second embodiment of Patent Literature 2, a gas flow rate of discharging the gas through the ejection tube to cause the solid matters to flow and a gas flow rate of smoothly moving the flowing solid matters toward the opening portion formed in the upper portion of the tubular body.

That is, an object of the present invention is to provide a nozzle, a solid matter unloading device, a solid matter unloading system, and a solid matter unloading method capable of improving a work efficiency and work accuracy of a work of unloading solid matters from a tubular body.

Solution to Problem

A nozzle according to one embodiment of the present invention is a nozzle which is connectable to a conduit for supplying gas to a tubular body filled with granular solid matters. The nozzle includes: a flow path which allows the gas to flow; a tip opening portion which is formed on a tip side of the flow path; a base end opening portion which is formed on a base end side of the flow path; and a side hole which is formed on the base end side from the tip opening portion and allows a part of the gas flowing through the flow path to be discharged toward the base end side. The one or more tip opening portions are formed in a direction of the flow path, the one or more side holes are formed along a circumferential direction of the flow path, and when the gas is supplied from the base end opening portion, a ratio ($Q1a/Q1b$) of a flow rate ($Q1a$) of the gas discharged from the one or more tip opening portions and a flow rate ($Q1b$) of the gas discharged from the one or more side holes is 0.05 to 0.7.

A solid matter unloading method according to another embodiment of the present invention is a solid matter unloading method which unloads granular solid matters to an outside of a tubular body by generating a suction force inside the tubular body while supplying gas to the tubular body filled with the solid matters through a nozzle connected to a conduit. The gas supply includes discharging the gas from one or more side holes formed in the nozzle along a circumferential direction of the nozzle toward a base end side of the nozzle while discharging the gas from one or more tip opening portions formed in the nozzle in a direction of a flow path of the nozzle toward the solid matters filled in the tubular body, and a ratio ($Q1a/Q1b$) of a flow rate ($Q1a$) of the gas discharged from the one or more tip opening portions and a flow rate ($Q1b$) of the gas discharged from the one or more side holes is 0.05 to 0.7.

Advantageous Effect of the Invention

According to the present invention, when the granular solid matters filled in the inside of the tubular body are unloaded, a balance between a discharge amount of the gas discharged toward the solid matters to cause the filled solid matters to flow and a discharge amount of the gas discharged to move the flowing solid matters to the upper end opening portion side of the tubular body can be adjusted appropriately. Therefore, with the gas discharged to the inside of the tubular body, it is possible to suppress the solid matters from being unloaded from the inside of the tubular body in an amount larger than desired, and it is possible to improve the work efficiency of unloading the solid matters and improve the unloading accuracy.

BRIEF DESCRIPTION OF DRAWINGS

FIG. 1 is an enlarged perspective view illustrating a part of an unloading device according to an embodiment.

FIG. 2 is a plan view of a nozzle according to the embodiment.

FIG. 3 is a front view of the nozzle as viewed from a direction of arrow 3 illustrated in FIG. 2.

FIG. 4 is a rear view of the nozzle as viewed from a direction of arrow 4 illustrated in FIG. 2.

FIG. 5 is a vertical cross-sectional view taken along a longitudinal direction of the nozzle and a conduit.

FIG. 6 is an enlarged view of a portion surrounded by a broken line portion 6 illustrated in FIG. 5.

FIG. 7 is a front view of a nozzle according to a modification.

FIG. 8 is a view simply illustrating a reactor according to the embodiment.

FIG. 9 is a cross-sectional view illustrating an inside of a tubular body according to the embodiment.

FIG. 10 is a cross-sectional view for explaining a solid matter unloading method according to the embodiment.

FIG. 11 is a cross-sectional view for explaining the solid matter unloading method according to the embodiment.

FIG. 12 is a cross-sectional view for explaining the solid matter unloading method according to the embodiment.

FIG. 13 is a cross-sectional view for explaining the solid matter unloading method according to the embodiment.

FIG. 14 is a cross-sectional view for explaining the solid matter unloading method according to the embodiment.

DESCRIPTION OF EMBODIMENTS

Hereinafter, an embodiment of the present invention will be described with reference to the accompanying drawings. The following description does not limit the technical scope and meaning of terms described in the claims. Further, the dimensional ratios in the drawings may be exaggerated for convenience of description and be different from the actual ratios. Further, a range "X to Y" described in this specification means "X or more and Y or less".

FIGS. 1 to 7 are views illustrating a solid matter unloading device (hereinafter referred to as an "unloading device") 10, a nozzle 100, and a conduit 200 according to the embodiment, FIG. 8 is a view simply illustrating a solid matter unloading system (hereinafter referred to as a "unloading system") 1 and a reactor 500 according to the embodiment, FIG. 9 is a cross-sectional view illustrating an inside 513 of a tubular body 510 according to the embodiment, and FIGS. 10 to 14 are cross-sectional views for explaining a solid matter unloading method (hereinafter, simply referred to as an "unloading method") according to the embodiment.

For example, as illustrated in FIGS. 8 and 9, the unloading method according to this embodiment can be carried out to unloading a granular solid matter (hereinafter, simply referred to as a "solid matter") M1 filled in the inside 513 of the tubular body 510 of the reactor 500 installed in a chemical plant to the outside of the tubular body 510.

The tubular body 510 is a reaction tube filled with, for example, a granular catalyst, granular ceramics (for example, silica spheres, alumina spheres, and zirconia spheres), granular metal raschig rings, and the like. At the upper end of the tubular body 510 in a height direction (a direction of arrow z1-z2 illustrated in FIGS. 8 and 9), an upper end opening portion 511 communicating with the outside of the tubular body 510 is formed. At the lower end of the tubular body 510 in the height direction, a lower end opening portion 512 communicating with the outside of the tubular body 510 is formed. For example, the tubular body 510 can be formed such that an inner diameter is 10 mm to 60 mm, and a height is 1000 mm to 15000 mm depending on a target catalytic reaction.

The inside 513 of the tubular body 510 may be filled with only the same type of solid matters, or, for example, as illustrated in FIGS. 8 and 9, a plurality of layers L1 and L2 configured by different types of solid matters M1 and M2 may be filled at different positions of the tubular body 510 in the height direction. In a case where the inside 513 of the tubular body 510 is filled with different types of solid matters, the first layer L1 can be configured by the granular solid matter M1, and the second layer L2 can be configured by the granular solid matter M2. As the solid matter M1, for example, a spherical catalyst for catalytic reaction in which an outer diameter is formed to be 1 mm to 15 mm can be used. As the solid matter M2, for example, a catalyst for catalytic reaction having a shape or composition different from that of the solid matter M1 or a metal raschig ring molded into a ring shape (annular) can be used. Although not illustrated, in the inside 513 of the tubular body 510, on the lower end side of the tubular body 510 with respect to the second layer L2, another layer may be further formed by granular solid matters of the same type as or a different type from the solid matter M1 or the solid matter M2.

The tubular body 510 is not limited to the reaction tube of the reactor 500 installed in the chemical plant. Further, the types of the solid matters M1 and M2 are not limited to those exemplified. Further, the shape and size of each of the solid matters M1 and M2 are not limited. Further, the aspect in which the solid matters M1 and M2 are filled in the inside 513 of the tubular body 510 (presence or absence of layer formation, height of each layer, number of layers, and the like) is not limited. Further, the tubular body 510 may not be arranged in a vertical direction as illustrated in FIG. 8 and may be arranged in an oblique direction or a horizontal direction, for example.

<Nozzle>

The nozzle 100 is a nozzle which can be connected to the conduit 200 that supplies gas to the tubular body 510 filled with granular solid matters M1 and M2. As illustrated in FIGS. 1, 2, and 5, the nozzle 100 has a flow path 140 which allows the gas to flow, a tip opening portion 111 formed on the tip side of the flow path 140, a base end opening portion 121 formed on the base end side of the flow path 140, and a side hole which is formed on the base end side from the tip opening portion 111 and allows a part of the gas flowing through the flow path 140 to be discharged toward the base end side. One or more tip opening portions 111 are formed in the direction of the flow path 140, and one or more side holes are formed along the circumferential direction of the flow path 140. For example, the nozzle 100 can have six side holes indicated by reference signs 151, 152, 153, 154, 155, 156 in FIG. 1. In the nozzle 100, the tip opening portion 111 and the side holes are provided such that when gas is supplied from the base end opening portion 121 of the nozzle 100 toward the tip side, a ratio (Q1a/Q1b) of a flow rate (Q1a) of the gas discharged from one or more tip opening portions 111 and a flow rate (Q1b) of the gas discharged from one or more side holes is 0.05 to 0.7.

In each drawing, a longitudinal direction of the nozzle 100 is indicated by reference sign X, a first direction orthogonal to the longitudinal direction is indicated by reference sign Y, and a second direction orthogonal to each of the longitudinal direction and the first direction is indicated by reference sign Z. Further, in the description of this specification, the tip side of the nozzle 100 means the tip side (the left side of FIG. 2 and the lower side of FIG. 5) in an insertion direction into the tubular body 510, and the base end side of the nozzle 100 means the side (the right side of FIG. 2 and the upper side of FIG. 5) where the conduit 200 connected to the nozzle 100 is arranged.

As illustrated in FIG. 10, a gas flow a1 discharged from the tip opening portion 111 of the nozzle 100 mainly loosens the solid matter M1 filled in the inside 513 of the tubular body 510, and a gas flow a2 discharged from one or more side holes of the nozzle 100 mainly severs to push up (move) the loosened solid matter M1 to the upper end opening portion 511 of the tubular body 510. As a result, the solid matter M1 can be efficiently unloaded to the outside of the tubular body 510.

As illustrated in FIGS. 1, 2, and 3, the nozzle 100 can have a tip portion 110, a base end portion 120, and a body portion 130 positioned between the tip portion 110 and the base end portion 120.

The tip portion 110 can be formed so as to have a tapered shape in which an outer diameter becomes smaller toward the tip side. Incidentally, the shape of the tip portion 110 is not particularly limited. For example, the tip portion 110 may have a shape in which the tip is rounded and curved toward the tip side or may extend toward the tip side in a substantially linear shape with a constant outer diameter.

For example, the body portion 130 can be formed so as to extend between the tip portion 110 and the base end portion 120 with a substantially constant outer diameter. For example, the base end portion 120 can be formed so as to have substantially the same outer diameter as the body portion 130.

For example, the nozzle 100 can be formed of a metal material. As the metal material forming the nozzle 100, for example, stainless steel can be used. However, the material forming the nozzle 100 is not particularly limited. The nozzle 100 may be formed of a metal material other than stainless steel or may be formed of a material, such as resin, other than the metal material.

The cross-sectional shape (the shape of the orthogonal cross section illustrated in a Y-Z plane) of the body portion 130 can be formed, for example, in a substantially circular shape. In order that the cross-sectional shape of the body portion 130 of the nozzle 100 is circular, for example, manufacturing can be made in such a manner that one side hole is formed in each of the six flat planes of a tubular member having a hexagonal cross-sectional shape, and then a chamfering process is performed on each plane of the tubular member such that the cross-sectional shape of the tubular member is circular. Incidentally, the cross-sectional shape of the body portion 130 is not limited to a circle. For example, the cross-sectional shape of the body portion 130 may be an ellipse or a polygon such as a hexagon. However, in a case where the cross-sectional shape of the body portion 130 is circular (in other words, the outer shape of the body portion 130 is cylindrical), the solid matter M1 moved to the base end side of the nozzle 100 is hardly caught between the nozzle 100 and the inner wall of the tubular body 510. Therefore, when the work of unloading the solid matter M1 is carried out, it is possible to smoothly move the solid matter M1 toward the upper end side of the tubular body 510, and it is possible to suppress that the secondary blockage of the solid matter M1 occurs inside the tubular body 510.

As illustrated in FIGS. 2 and 5, the flow path 140 is formed to have a first portion 141 formed inside the tip portion 110, a second portion 142 formed inside the body portion 130, and a third portion 143 formed inside the base end portion 120.

The flow path 140 can be formed to have a circular cross-sectional shape (the shape of the orthogonal cross section illustrated in a Y-Z plane). For example, as illustrated in FIG. 5, in the first portion 141, a diameter (flow path diameter) can be formed to be smaller than those of the second portion 142 and the third portion 143. Further, a transition portion of which the diameter gradually decreases toward the tip side can be formed between the first portion 141 and the second portion 142. Incidentally, the formation of the third portion 143 may be omitted. Further, the first portion 141 and the second portion 142 may have substantially the same diameter or may have different diameters.

As illustrated in FIGS. 2 and 5, a step portion 143a for inserting and connecting the tip portion 210 of the conduit 200 into the base end portion 120 of the nozzle 100 can be formed in the third portion 143. At this time, the conduit 200 can be fixed to the nozzle 100 in a state where the tip portion 210 of the conduit 200 is arranged to be abutted against the step portion 143a. The position where the base end opening portion 121 is formed is not particularly limited as long as the base end opening portion is closer to the base end side than one or more side holes of the nozzle 100, and gas can be supplied into the flow path 140. A method of fixing the conduit 200 and the nozzle 100 is not particularly limited, but a method such as adhesion, thermal deposition, or welding can be adopted depending on the materials of the conduit 200 and the nozzle 100 and the like. Incidentally, it is also possible to insert the base end portion 120 of the nozzle 100 into inside the tip portion 210 of the conduit 200 to fix the conduit 200 and the nozzle 100. Further, the conduit 200 and the nozzle 100 can be connected via another tubular member (adapter).

As illustrated in FIG. 3, the tip opening portion 111 of the nozzle 100 can be formed in a circular shape in a plan view (a plan view seen from the direction of arrow 3 illustrated in FIG. 2) from the front of the nozzle 100. The nozzle 100 discharges the gas which flows into the flow path 140 of the nozzle 100 through the conduit 200 toward the tip side of the nozzle 100 through the tip opening portion 111. The planar shape of the tip opening portion 111 is not limited to a circle, and may be, for example, an ellipse, a polygon, or the like. Further, the number of the tip opening portions 111 formed in the nozzle 100 is not particularly limited as long as the number is one or more. Further, the specific shape or the like of the tip opening portion 111 is not particularly limited as long as it is possible to form a gas flow for causing the solid matter M1 to flow on the tip side of the nozzle 100. For example, the tip opening portion 111 may be open in an oblique direction with respect to an axis c1 of the flow path 140 illustrated in FIG. 5.

The nozzle 100 is formed with one or more side holes for discharging a part of the gas flowing through the flow path 140 toward the base end side of the nozzle 100 along the circumferential direction of the nozzle 100. Incidentally, the number of the side holes formed in the nozzle 100 is not particularly limited as long as the number is one or more.

As illustrated in FIG. 2, the first side hole 151 of the nozzle 100 can be formed in a substantially circular shape in a plan view when viewed in an X-Y plane. The number of the side holes may be one or more and preferably two or more. As an example, FIGS. 1 to 3 illustrate an example of the nozzle 100 having six side holes. In the nozzle 100, each of the first side hole 151, the second side hole 152, the third side hole 153, the fourth side hole 154, the fifth side hole 155, and the sixth side hole 156 can be formed to have substantially the same shape. However, in each of one or more side holes formed in the nozzle 100, a shape, an outer diameter, or the like may be different. Further, the planar shape of the side hole is not limited to a circle, and may be, for example, an ellipse, a polygon, or the like. Further, the position where the side hole is formed in the nozzle 100 is not particularly limited as long as a gas flow can be formed toward the base end side of the nozzle 100. Further, in a case where two or more side holes are formed in the nozzle 100, it is preferable that the side holes are formed at equal intervals from each other in the circumferential direction of the nozzle 100. Further, for example, the side hole may be formed in a portion other than the body portion 130.

The number and opening diameter of the tip opening portions 111 of the nozzle 100 and the number and opening diameter of the side holes of the nozzle 100 can be arbitrarily set within a range where a ratio of the flow rate (Q1a) of the gas discharged from one or more tip opening portions and the flow rate (Q1b) of the gas discharged from one or more side holes is 0.05 to 0.7. For example, in a case where the opening shape of the tip opening portion 111 is circular, and only one tip opening portion 111 is provided, a diameter d1 (see FIG. 6) of the tip opening portion 111 can be 0.5 to 4.0 mm. Further, for example, in a case where the opening shape of the side hole is circular, and six side holes are provided, a diameter d2 (see FIG. 6) of each side hole can be 0.5 to 4.0 mm.

In FIG. 3, in the nozzle 100, the side holes are arranged at equal intervals from each other along the circumferential direction (the circumferential direction of the axis c1 illustrated in FIG. 5) of the flow path 140. In the nozzle 100 illustrated in FIG. 3, six side holes are formed, and an angle θ1 of each of the side holes adjacent in the circumferential direction of the flow path 140 is 60°. Incidentally, the angle θ1 does not have to be exactly 60°, and may vary within a range of dimensional tolerances, for example. Further, in a case where the number of the side holes formed in the nozzle 100 is other than six, the angle θ1 can be changed according to the number of the side holes. Further, the angle θ1 formed between the side holes does not have to have a uniform size, and the size may differ in the circumferential direction of the flow path 140. However, it is preferable that all angles θ1 are uniform from the viewpoint of forming even gas flows around the nozzle 100 when the gas is discharged from the side holes.

The positions of one or more side holes in the longitudinal direction (X-axis direction) of the nozzle 100 are not particularly limited. However, in order to quickly move the solid matter M1 flowing in the inside 513 of the tubular body 510 toward the upper end opening portion 511 of the tubular body 510, it is preferable to form one or more side holes at positions 3 mm to 50 mm away from the tip opening portion 111 of the nozzle 100 to the base end side in the longitudinal direction, it is further preferable to form one or more side holes at positions 5 mm to 25 mm away from the tip opening portion 111 to the base end side in the longitudinal direction, and it is further preferable to form one or more side holes at positions 5 mm to 15 mm away from the tip opening portion 111 to the base end side in the longitudinal direction. Further, in a case where one or more side holes are formed in the nozzle 100, the side holes may be formed at different positions in the longitudinal direction (X-axis direction) of the nozzle 100. That is, in a case where the number of holes is two or more, all the side holes may or may not be formed along the same circumferential direction of the flow path 140.

The opening area of the tip opening portion 111 of the nozzle 100 can be formed to be, for example, 0.2 mm² to 12.6 mm². Further, the opening area of the tip opening portion 111 of the nozzle 100 is preferably 0.79 mm² to 4.9 mm² and more preferably 1.13 mm² to 2 mm².

The tip opening portion 111 and each side hole are formed in the above dimensional example, so that when gas is supplied from the base end opening portion 121 of the nozzle 100, the ratio (Q1a/Q1b) of the flow rate (Q1a) of the gas discharged from one or more tip opening portions 111 and the flow rate (Q1b) of the gas discharged from one or more side holes can be set to a desired size of 0.05 to 0.7.

As illustrated in FIG. 6, one or more side holes formed in the nozzle 100 can be open toward the base end side of the nozzle 100 at an angle of 30° or more and less than 90° with respect to the axis c1 of the flow path 140. For example, in a case where each side hole has a constant diameter on the cross-sectional view of the nozzle 100 along the longitudinal direction illustrated in FIG. 6, an angle θ2 at which each side hole is inclined with respect to the axis c1 can be defined by an angle formed between a straight line h1 passing through a center position of the side hole and the axis c1. Further, in a case where the side hole does not have a constant diameter (for example, a case where the side hole has a cross-sectional shape such that the diameter changes in a tapered shape), the angle θ2 can be defined, for example, by an angle formed between a line connecting the center position of the side hole positioned on the inner wall side of the nozzle 100 and the center position of the side hole positioned on the outer wall side of the nozzle 100 and the axis c1. Incidentally, in FIG. 6, for convenience of illustration, only the second side hole 152 and the fifth side hole 155 are illustrated. However, similarly to the second side hole 152 and the fifth side hole 155, the other side holes 151, 153, 154, and 156 also can be open toward the base end side of the nozzle 100 at an angle of 30° or more and less than 90° with respect to the axis c1 of the nozzle 100.

The angle θ2 at which the side hole is inclined is not particularly limited as long as a gas flow toward the base end side of the nozzle 100 can be formed by the gas discharged from the side hole. For example, the angle θ2 at which the side hole is inclined may be larger than 0°. However, in consideration of workability when forming the side hole in the nozzle 100, the angle θ2 at which the side hole is inclined is preferably 30° or more and less than 90°.

Each side hole of the nozzle 100 is open toward the base end side at the above-described angle, and thus when gas is discharged from each side hole, the solid matter M1 can be easily maintained in the state (the state illustrated in FIG. 10) of being drifted up in the inside 513 of the tubular body 510. Incidentally, in consideration of maintaining a more stable state in which the solid matter M1 is drifted up in the inside 513 of the tubular body 510, and a blockage is unlikely to occur, the angle θ2 at which each side hole is open toward the base end side is, for example, preferably 30° to 60°, and more preferably 40° to 50°.

The dimensions of each portion of the nozzle 100 are not particularly limited. However, for example, the length of the nozzle 100 in the longitudinal direction can be formed to be 20 mm to 400 mm. Incidentally, the diameters of the first portion 141, the second portion 142, and the third portion 143 may be different from each other, or all may be the same. Further, the diameter of the second portion 142 of the flow path 140 can be formed to be, for example, 4 mm. Further, the outer diameter of the body portion 130 of the nozzle 100 can be formed to be, for example, 5 mm.

FIG. 7 illustrates a nozzle in which four side holes of the first side hole 151, the second side hole 152, the third side hole 153, and the fourth side hole 154 are formed. The number of the side holes formed in the nozzle is not particularly limited as long as the number is one or more as in this nozzle. Further, in this nozzle, four side holes are formed, and it is preferable that the angles θ1 of the side holes adjacent to each other in the circumferential direction of the flow path 140 are formed at 90° so as to be uniform in the circumferential direction. Further, in a case where a plurality of side holes are formed as in this nozzle, all angles θ1 may be the same in the circumferential direction of the flow path 140 or may be different. Further, in this nozzle, all the angles θ2 at which the side holes are open toward the base end side can be set to be the same size, or two side holes (for example, the side holes 151 and 153) which are in diagonal positions (opposite positions on the front view illustrated in FIG. 7) can be set to be the same size (for example, 45°), and other paired side holes (for example, the side holes 152 and 154) can be set to be the other same size (for example, 60°). The angle at which the side hole is open to the base end side is an example and can be changed. Further, even in a case where the number of side holes formed in the nozzle is an even number of 4 or more, the opening angles θ2 can be made different for each pair of side holes arranged. Further, in a case where one or more side holes are formed in the nozzle, the angle θ2 at which the side holes are open may be different for each of one or more side holes, or a set of side holes having the same angle and side holes having other angles may be formed. Incidentally, in a case where a plurality of side holes are formed in the nozzle, the number of side holes may be an odd number. Even in a case where the number of the side holes formed in the nozzle is odd, the sizes of the angle θ1 formed between the side holes and the angle θ2 at which the side holes are open are not particularly limited.

Incidentally, the nozzle according to the present invention is provided with one or more tip opening portions and one or more side holes. The specific configuration thereof is not limited as long as the ratio (Q1a/Q1b) of the flow rate (Q1a) of the gas discharged from one or more tip opening portions and the flow rate (Q1b) of the gas discharged from one or more side holes is 0.05 to 0.7. For example, the nozzle is provided with one tip opening portion and one side hole, and the angle θ2 of the side hole may be 30° or more and 90° or less. Further, for example, in a case where a plurality of side holes are provided in the nozzle, the angles θ1 formed between the side holes do not have to be uniform.

<Conduit>

As illustrated in FIG. 5, the conduit 200 can be configured by a hollow tubular member formed with a flow path 215 therein. In FIG. 5, the tip portion 210 of the conduit 200 is inserted into the flow path 140 of the nozzle 100 via the base end opening portion 121 of the nozzle 100. The flow path 215 of the conduit 200 communicates with the flow path 140 of the nozzle 100 via a tip opening portion 211 of the conduit 200 in a state where the nozzle 100 is connected. The gas supplied into the flow path 215 of the conduit 200 flows into the flow path 140 of the nozzle 100 through the flow path 215 of the conduit 200 and the tip opening portion 211.

The conduit 200 can be configured by, for example, a known pipe (or tubular member) made of rubber, resin, metal, or the like. The conduit 200 can be configured, for example, by a material or the like capable of transmitting a pushing force applied to the conduit 200 from the upper end opening portion 511 side (see FIG. 9) of the tubular body 510 toward the tip side of the nozzle 100 to the solid matter M1 filled in the tubular body 510. Incidentally, the upper end opening portion 511 indicates the position of the "upper end of the tubular body" for convenience in the description of the embodiment, but the insertion points of the nozzle 100 and the conduit 200 into the tubular body 510 are not limited to only the upper end of the tubular body 510.

The solid matter M1 adsorbs water and the like and hardens in a lump shape while being still placed in the inside 513 of the tubular body 510, or when the catalytic reaction is continued for a certain period of time, a part of reaction by-products or catalytic components or the like may adhere to the surface of the solid matter, so that the solid matters stick to each other or stick to the inner wall of the tubular body 510. In a case where the conduit 200 is configured to be able to transmit the pushing force as described above, when the work of unloading the solid matter M1 is performed, the conduit 200 is pushed into the inside 513 of the tubular body 510 as illustrated in FIG. 12, and the tip portion 110 of the nozzle 100 is caused to collide with the solid matter M1 stuck at the inside 513 of the tubular body 510 to apply an impact force, whereby the sticking of the solid matter M1 can be loosened. Accordingly, the solid matter M1 can be smoothly unloaded.

In order to enable an impact force to be applied to the solid matter M1 stuck at the inside 513 of the tubular body 510 as described above, preferably, the conduit 200 is configured, for example, of a resin material or a metal material of which the rigidity is relatively high.

The outer diameter of the conduit 200 is not particularly limited. However, it is preferable that the outer diameter is formed in a dimension that can prevent that the solid matter M1 or the solid matter M2 is caught between the inner wall of the tubular body 510 and the conduit 200 to cause clogging when the conduit 200 is inserted into the inside 513 of the tubular body 510. Further, the inner diameter of the conduit 200 is not particularly limited. However, when the inner diameter of the conduit 200 is excessively small, a sufficient amount of gas for floating the solid matter M1 cannot be sent to the nozzle 100. From this point of view, it is preferable that the inner diameter of the tubular body 510 and the outer diameter of the conduit 200 are formed to satisfy, for example, following Equation 1.

Particle size of solid matter M1 or solid matter M2 [mm]≤(inner diameter of tubular body 510 [mm]−outer diameter of conduit 200 [mm])/2   (Equation 1)

As for the inner diameter of the conduit 200, it is sufficient that the conduit 200 has a lumen enough to introduce an amount of gas that can loosen the solid matter M1 and the solid matter M2 and move them to the base end side of the conduit 200, and for example, the inner diameter can be 2 mm to 10 mm.

For example, in order to enable an impact force to be applied to the solid matter M1 stuck at the inside 513 of the tubular body 510, as illustrated in FIG. 13, the conduit 200 can have a plurality of relay tubes 250 which are divided along the extending direction of the conduit 200 and have a predetermined rigidity and a connecting portion 251 which connects adjacent relay tubes 250 to each other. The length of each relay tube 250 is formed shorter than the total length of the conduit 200. Therefore, it is possible to prevent the entire conduit 200 from being extremely bent at the inside 513 of the tubular body 510 over the entire length thereof. Therefore, when the conduit 200 is pushed into the inside 513 of the tubular body 510, the pushing force can be reliably transmitted to the tip side of the conduit 200 via each relay tube 250. Incidentally, the material of the relay tube 250 and the material of the connecting portion 251 are not particularly limited, but for example, a resin material or a metal material can be used. Further, the number of the relay tubes 250 and the length of one relay tube 250 are not particularly limited.

<Unloading Device>

As illustrated in FIGS. 1 and 5, the unloading device 10 can have the nozzle 100 and the conduit 200 to which the nozzle 100 is connected.

The unloading device 10 can be configured as a device which can be used in the unloading method of the solid matter M1. The flow path 215 through which gas can flow is formed inside the conduit 200. The nozzle 100 can be connected to the tip portion 210 of the conduit 200. In the nozzle 100, the gas supplied from the conduit 200 and the base end opening portion 121 into the flow path 140 of the nozzle 100 is discharged through one or more tip opening portions 111 of the nozzle 100 and one or more side holes to the outside of the nozzle 100. The gas flow discharged from the tip opening portion 111 of the nozzle 100 is schematically illustrated by arrow a1 in FIG. 10, and the gas flow discharged from one or more side holes of the nozzle 100 is schematically illustrated by arrow a2 in FIG. 10. Incidentally, the type of the gas discharged from the nozzle 100 is not particularly limited, and for example, nitrogen, air, or a mixture of nitrogen and air at a constant ratio can be used, but air is most preferable from the viewpoint of safety and economy.

As illustrated in FIGS. 9 and 11, the unloading device 10 can also include an impact force applying member 310 configured to be insertable into the inside 513 of the tubular body 510 together with the conduit 200 to which the nozzle 100 is connected. The impact force applying member 310 can be configured such that the pushing force applied from the upper end opening portion 511 side of the tubular body 510 toward the tip side of the nozzle 100 can be transmitted to the solid matter M1 filled in the tubular body 510. As described above, in a case where the solid matter M1 is stuck at the inside 513 of the tubular body 510, the impact force applying member 310 can be used to apply an impact force to the solid matter M1 stuck at the inside 513 of the tubular body 510. The impact force applying member 310 can be configured of, for example, a metal linear member (such as a piano wire) or a rod-shaped member. Incidentally, the length, cross-sectional shape, thickness, specific material, and the like of the impact force applying member 310 are not particularly limited.

Further, as illustrated in FIG. 14, the unloading device 10 may have an impact force applying member 330 attached to a part of the outer peripheral surface of the tip portion 110 or the body portion 130 of the nozzle 100. The impact force applying member 330 can be made of, for example, a linear member or rod-shaped member made of metal or resin similarly to the impact force applying member 310. When the solid matter M1 is unloaded from the inside 513 of the tubular body 510, the impact force is applied to the solid matter M1 stuck at the inside 513 of the tubular body 510 by the impact force applying member 330 while gas is discharged from the tip opening portion 111 of the nozzle 100, whereby the sticking of the solid matter M1 can be loosened, and the solid matter M1 can be smoothly unloaded. Incidentally, the tip of the impact force applying member 330 can be formed, for example, into a sharp shape that is sharp toward the tip side. When the tip of the impact force applying member 330 is formed in the above-described shape, it is possible to easily loosen the sticking of the solid matter M1 stuck in the inside 513 of the tubular body 510. The length, cross-sectional shape, thickness, attaching position to the nozzle 100, specific material, and the like of the impact force applying member 330 are not particularly limited.

<Unloading System>

As illustrated in FIGS. 8 and 9, the unloading system can include the unloading device 10 (see FIG. 1) including the nozzle 100 and the conduit 200, a gas supply machine 410 which supplies gas to the inside 513 of the tubular body 510 via the nozzle 100 and the conduit 200, and a suction machine 420 which generates a suction force to inside 513 of the tubular body 510 to move the solid matter M1 to the outside of the tubular body 510.

The gas supply machine 410 can be configured by, for example, a known compressor capable of delivering compressed air. The conduit 200 can be connected to the gas supply machine 410. The unloading system 1 may be provided with, for example, a tube for extending the conduit 200 and connecting to the gas supply machine 410, a unit (control device) for adjusting the output of the gas supply machine 410, a predetermined valve, and the like. Incidentally, the adjustment of the output of the gas supply machine 410 while the unloading method is being performed can be performed, for example, by a worker or the like (not illustrated).

The suction machine 420 can be configured by, for example, a known dust collector which sucks gas to generate a negative pressure. As illustrated in FIGS. 8 and 9, the suction machine 420 can be connected to the tubular body 510 via a pipe 320, a tube t1, a collection container 430, and a tube t2.

In order to unload the solid matter M1 from the inside 513 of the tubular body 510, it is necessary that a gas linear velocity acting in the direction of moving the solid matter M1 filled in the inside 513 of the tubular body 510 to the outside of the tubular body 510 is set to be larger than a terminal settling velocity (u) of the solid matter M1. In this embodiment, when the inside 513 of the tubular body 510 is sucked with a fluid amount (Q2) exceeding a fluid amount (Q0) at which the gas linear velocity in the inside 513 of the tubular body 510 is equal to the terminal settling velocity (u), the solid matter M1 can be unloaded. Incidentally, the definition of the terminal settling velocity (u) in this specification will be described later.

Here, the gas suction amount Q2 in this embodiment can be conditional on satisfying, for example, following Equation 2.

$$Q2/Q0 > 1 \quad \text{(Equation 2)}$$

For example, when $Q2/Q0 \leq 1$, it becomes difficult to unload the solid matter M1. Therefore, it is preferable to satisfy the condition of 1. Incidentally, Q2/Q0 may be larger than 1, but from the economical point of view at the time of unloading work, Q2/Q0 is 1.5 or less, preferably 1.3 or less, and more preferably 1.15 or less.

As illustrated in FIG. 9, an internal space 321 through which gas flows can be formed in the pipe 320. The tube t1 can be connected to the opening portion positioned on one end side of the pipe 320. The opening portion positioned on the other end side of the pipe 320 can be connected to the upper end opening portion 511 of the tubular body 510. The inside 513 of the tubular body 510 can be connected to the collection container 430 via the pipe 320 and the tube t1. Further, as illustrated in FIG. 8, the collection container 430 and the suction machine 420 can be connected via the tube t2. When the suction machine 420 is operated, the inside 513 of the tubular body 510 is sucked, and the solid matter M1 to be unloaded is transferred to the collection container 430 via the pipe 320 and the tube t1. Incidentally, the types, layouts, and the like of the devices, equipment, members, appliances, and the like used in the unloading system 1 are not particularly limited and can be changed as appropriate.

Each of the tubes t1 and t2 can be configured by, for example, a hollow tubular member in which a flow path is formed inside. The collection container 430 can be configured by, for example, a metal container (a drum can or the like). The internal structure of the collection container 430 is not particularly limited. The collection container 430 can have a structure that the unloaded solid matter is collected and stored inside the collection container 430, and the solid matter is prevented from being moved to the tube t2 and the suction machine 420 as much as possible.

The pipe 320 can be configured by, for example, a known L-shaped pipe. As illustrated in FIG. 9, the pipe 320 is formed with a hole 321a for inserting the nozzle 100 and the conduit 200 into the inside 513 of the tubular body 510 via the internal space 321 of the pipe 320 and a hole 321b for inserting the impact force applying member 310 into the inside 513 of the tubular body 510 through the internal space 321 of the pipe 320. Incidentally, the size and shape of the hole 321a are not limited as long as the nozzle 100 and the conduit 200 can be inserted.

Further, the size and shape of the hole 321b are not limited as long as the impact force applying member 310 can be inserted. For example, the hole 321a and the hole 321b may be formed with the same diameter or may be formed with different diameters. Further, the pipe 320 may be provided with one hole having both the functions of the hole 321a and the hole 321b.

<Unloading Method>

Next, an unloading method of the solid matter M1 will be described. Here, an example of a work procedure for selectively unloading the solid matter M1 forming the first layer L1 from the solid matters M1 and M2 filled in layers in the tubular body 510 will be described.

In the unloading method according to this embodiment, as illustrated in FIGS. 8 and 9, the nozzle 100 and the conduit 200 are inserted into the inside 513 of the tubular body 510 filled with the solid matter M1. Further, if needed, in the unloading method according to this embodiment, the impact force applying member 310 provided in the unloading device 10 is inserted into the inside 513 of the tubular body 510. Incidentally, the unloading method, for example, may be performed by a plurality of people such as a worker H1 and a worker H2, or may be performed by the worker H1 or the worker H2 alone.

As illustrated in FIGS. 8, 9 and 10, in the unloading method according to this embodiment, while gas is supplied from the gas supply machine 410 to the inside 513 of the tubular body 510 filled with the solid matter M1 via the conduit 200 and the nozzle 100, a suction force is generated by the suction machine 420 in the inside 513 of the tubular body 510 to unload the solid matter M1 to the outside of the tubular body 510. In the unloading method according to this embodiment, when gas is supplied to the inside 513 of the tubular body 510, while the gas is discharged from the tip opening portion 111 (see FIGS. 2 and 6) formed in the nozzle 100 toward the solid matter M1 filled in the inside 513 of the tubular body 510, the gas is discharged from one or more side holes (see FIGS. 2 and 6) formed in the nozzle 100 toward the base end side of the nozzle 100. The direction of the gas flow generated by the suction of the suction machine 420 is preferably the direction opposite to the supply direction of the gas supplied through the conduit 200 and the nozzle 100, that is, the direction toward the upper end opening portion 511 side of the tubular body 510. Incidentally, in FIG. 10, the suction of gas by the suction machine 420 is indicated by arrow b.

As described above, in the nozzle 100, when gas is supplied from the base end opening portion 121, the ratio (Q1a/Q1b) of the flow rate (Q1a) of the gas discharged from one or more tip opening portions 111 and the flow rate (Q1b) of the gas discharged from one or more side holes is 0.05 to 0.7. Therefore, the flow rate of the gas discharged from one or more tip opening portions 111 and the total flow rate of the gas discharged from one or more side holes are adjusted to an appropriate balance. Therefore, the nozzle 100 can suppress the flow rate of the gas directly blowed onto the filled solid matter M1 from becoming excessively large or excessively small. Further, in the nozzle 100, even in a case where a plurality of solid matters M1 are stuck to the inside 513 of the tubular body 510, the sticking of the solid matters M1 can be loosened by the gas discharged from the tip opening portion 111, and the solid matters M1 can be easily drifted up toward the upper end opening portion 511 side of the tubular body 510.

By blowing the gas discharged from one or more side holes toward the base end side of the nozzle 100, the solid matter M1 drifted up to the upper end opening portion 511 side of the tubular body 510 is maintained in the state of being drifted up in the inside 513 of the tubular body 510. In the unloading method according to this embodiment, while the solid matter M1 is drifted up by the gas discharged from the nozzle 100, the suction machine 420 is operated to generate a suction force in the inside 513 of the tubular body 510, whereby the solid matter M1 can be smoothly moved and unloaded to the outside of the tubular body 510 through the upper end opening portion 511 of the tubular body 510.

Here, in the method of unloading the solid matter M1, a ratio (Q1/Q2) of a total discharge amount (Q1) per unit time of the gas discharged from one or more tip opening portions 111 and one or more side holes and a suction amount (Q2) per unit time of sucking the inside 513 of the tubular body 510 is preferably set to be 1 or less. The solid matter M1 can be unloaded even when Q1/Q2 is larger than 1. However, when Q1/Q2 is 1 or less, the solid matter M1 moved to the upper end side of the tubular body 510 can be efficiently discharged to the collection container 430 arranged outside the reactor 500. Further, by adjusting a relationship between the gas discharge amount (Q1) and the suction amount (Q2) in this way, the balance between the inflow amount of the gas supplied to the inside 513 of the tubular body 510 and the suction amount of the gas sucked from the inside 513 of the tubular body 510 becomes appropriate. For example, when the discharge amount of gas is excessively large compared with the suction amount of gas, the gas flows to the lower end opening portion 512 of the tubular body 510, and the solid matter M2 filled in the second layer L2 positioned below the first layer L1 flows. As a result, the solid matter M2 is drifted up in the inside 513 of the tubular body 510, and the solid matter M2 moves to the outside of the tubular body 510 together with the solid matter M1. Further, for example, when the inflow amount of gas is excessively small as compared with the suction amount of gas, the air outside the tubular body 510 is drawn into the inside 513 of the tubular body 510 through the lower end opening portion 512 of the tubular body 510. Thus, the solid matter M2 filled in the second layer L2 positioned below the first layer L1 flows. As a result, as in a case where the inflow amount of gas is excessively large as compared with the suction amount of gas, the solid matter M2 moves to the outside of the tubular body 510 together with the solid matter M1.

For the above problems, when the ratio (Q1/Q2) of the total discharge amount (Q1) per unit time of the gas discharged from one or more tip opening portions 111 and one or more side holes and the suction amount (Q2) per unit time of the inside 513 of the tubular body 510 is set to be 1 or less, the balance between the inflow amount of the gas supplied to the inside 513 of the tubular body 510 and the suction amount of the gas sucked from the inside 513 of the tubular body 510 becomes appropriate, and the solid matter M1 filled in the first layer L1 can be unloaded with high accuracy.

Incidentally, as described above, it is preferable that the ratio (Q1/Q2) of the total discharge amount (Q1) per unit time of the gas discharged from one or more tip opening portions 111 and one or more side holes and the suction amount (Q2) per unit time of the inside 513 of the tubular body 510 is 1 or less. However, in consideration of the balance between the gas inflow amount to the inside 513 of the tubular body 510 and the suction amount of the gas sucked from the inside 513 of the tubular body 510, the ratio is preferably 0.3 to 0.8 and more preferably 0.5 to 0.7.

In a case where the solid matter M1 is stuck to the inside 513 of the tubular body 510, in the unloading method according to this embodiment, for example, as illustrated in FIG. 11, the impact force applying member 310 is used to apply an impact force to the solid matter M1 stuck in the inside 513 of the tubular body 510, whereby the sticking of the solid matter M1 can be loosened. Incidentally, when the impact force applying member 310 is used to apply the impact force, the gas discharge from the nozzle 100 may be continued or stopped. For example, in a case where there is a possibility that an impact force is applied to the second layer L2, by stopping the gas discharge from the nozzle 100, it is possible to suppress the solid matter M2 filled in the second layer L2 from excessively flowing due to the gas.

Further, as illustrated in FIGS. 12, 13, and 14, the conduit 200 is pushed toward the tip side to apply an impact force directly through the nozzle 100 or by using the impact force applying member 330, whereby the sticking of the solid matter M1 can be loosened. The work of applying an impact force by using the impact force applying member 310 and the work of applying an impact force by using the conduit 200 and the impact force applying member 330 can be carried out in an arbitrary combination in the work of unloading the solid matter M1 from one tubular body 510. Further, the timing, the number of times, and the like of performing the work of applying an impact force to the solid matter M1 are not particularly limited. Further, the work of unloading the solid matter M1 and the work of applying an impact force to the solid matter M1 may be carried out by one worker H1 or may be carried out by a plurality of workers.

As described above, the nozzle 100 according to this embodiment is a nozzle configured to be connectable to the conduit 200 for supplying gas to the tubular body 510 filled with the granular solid matter M1. The nozzle 100 has the flow path 140 which allows the gas to flow, the tip opening portion 111 formed on the tip side of the flow path 140, the base end opening portion 121 formed on the base end side of the flow path 140, and the side hole which is formed on the base end side from the tip opening portion 111 and allows a part of the gas flowing through the flow path 140 to be discharged toward the base end side. One or more tip opening portions 111 are formed in the direction of the flow path 140, and one or more side holes are formed along the circumferential direction of the flow path 140. In the nozzle 100, when gas is supplied through the base end opening portion 121, the ratio (Q1a/Q1b) of the flow rate (Q1a) of the gas discharged from one or more tip opening portions 111 and the flow rate (Q1b) of the gas discharged from one or more side holes is 0.05 to 0.7.

The solid matter unloading method is a method in which while gas is supplied to the tubular body 510 filled with the granular solid matter M1 through the nozzle 100 connected to the conduit 200, a suction force is generated in the inside 513 of the tubular body 510 to unload the solid matter M1 to the outside of the tubular body 510. The gas supply includes discharging the gas from one or more side holes formed in the nozzle 100 along the circumferential direction of the nozzle 100 toward the base end side of the nozzle 100 while discharging the gas from one or more tip opening portions 111 formed in the nozzle 100 in the direction of the flow path 140 of the nozzle 100 toward the solid matter M1 filled in the tubular body 510. In the solid matter unloading method, the ratio (Q1a/Q1b) of the flow rate (Q1a) of the gas discharged from one or more tip opening portions 111 and the flow rate (Q1b) of the gas discharged from one or more side holes is 0.05 to 0.7.

According to this embodiment, when the granular solid matter M1 filled in the inside 513 of the tubular body 510 is unloaded, a balance between a discharge amount of the gas discharged toward the solid matter M1 to cause the filled solid matter M1 to flow and a discharge amount of the gas discharged to move the flowing solid matter M1 to the upper end opening portion 511 side of the tubular body 510 can be adjusted appropriately. Therefore, with the gas discharged to the inside 513 of the tubular body 510, it is possible to suppress the solid matter M1 from being unloaded from the inside 513 of the tubular body 510 in an amount larger than desired, and it is possible to improve the work efficiency of unloading the solid matter M1 and improve the unloading accuracy.

Example

The following is an example for explaining the effect of the present invention. In the example, the embodiment of the present invention will be specifically described with reference to an example in which the ceramic balls filled in the tubular body are unloaded from the tubular body. Incidentally, in the description of the example, a part of the drawings described in the above-described embodiment will be cited and described together with the member numbers. However, the present invention is not limited to the contents shown in the drawings and the contents of the examples described below.

Table 1 shows the specifications of the nozzles used in the examples. Table 2 shows the results of the examples.

In the embodiment, an example in which the number of the side holes formed in the nozzle is six. However, the present invention is not limited to this, and it goes without saying that the number of side holes, $\theta 1$ and $\theta 2$, and the like can be appropriately changed according to the gist of the present invention.

In the examples, the unloading work was performed on ten tubular bodies (reaction tubes) filled with ceramic balls (granular solid matter) under respective conditions.

"The average time required for unloading", "the number of occurrences of secondary blockage", "the ratio (Q1a/Q1b) of the flow rate (Q1a) of the gas discharged from the tip opening portion and the flow rate (Q1b) of the gas discharged from the side hole", and "the terminal settling velocity (u) and the amount of air (Q0) forming the terminal settling velocity (u)" described in examples can be obtained as follows.

(1) As for the Average Time Required for Unloading (Average Unloading Time Per Tubular Body)

average time required for unloading (seconds/piece)= [total time required to unload solid matter (solid matter M1) from ten tubular bodies (seconds)]/10.

(2) As for the Number of Occurrences of the Secondary Blockage

The number is the frequency at which the secondary blockage occurs when the unloading work is performed on ten tubular bodies. Incidentally, the secondary blockage means a state where solid matters are caught between the outer surface of the conduit inserted into the tubular body and the inner wall of the tubular body or between the outer surface of the nozzle and the inner wall of the tubular body inside the tubular body to cause clogging. Even in a case where the secondary blockage occurs, it is not impossible to completely unload the solid matter from the inside of the tubular body.

(3) As for the Ratio (Q1a/Q1b) of the Flow Rate (Q1a) of the Gas Discharged from Tip Opening Portion and the Flow Rate (Q1b) of the Gas Discharged from the Side Hole Q1a: A flow rate ($Nm^3$/Hr) of the gas discharged from the tip opening portion of the nozzle Q1b: A flow rate (Nm³/Hr) of the gas discharged from all the side holes of the nozzle Q1: A flow rate (Nm³/Hr) of the gas flowing into the nozzle from the base end side, which is the total discharge amount of the nozzle. Q1 corresponds to Q1a+Q1b.

In the example, gas was introduced into the nozzle 100 through the conduit 200 at a flow rate of Q1. A tube for measuring the flow rate was attached to the tip opening portion 111 of the nozzle 100. The other end of the tube for measuring the flow rate was connected to a gas flow meter, and the gas flow rate Q1a was measured only for the gas discharged from the tip opening portion 111 of the nozzle 100. From the gas flow rate Q1 and the gas flow rate Q1a, the gas flow rate Q1b discharged from all the side holes of the nozzle 100 was obtained (Q1b=Q1−Q1a). From the above, the ratio (Q1a/Q1b) of the gas flow rate Q1a discharged from the tip opening portion 111 of the nozzle 100 and the gas flow rate Q1b discharged from all the side holes of the nozzle 100 was obtained.

(4) As for the Terminal Settling Velocity (u) and the Amount of Air (Q0) Forming the Terminal Settling Velocity (u)

A ceramic ball (silica alumina ball) having a diameter of 6 mm which is the same as the solid matter to be unloaded was prepared. Next, the same stainless steel tube (an inner diameter of 25 mm, a length of 6500 mm) as the tubular body to be unloaded was installed in the vertical direction, and air was caused to flow at a predetermined flow rate from the lower end opening portion of the tube. When one prepared silica alumina ball was dropped into the tube from the upper end opening portion of the tube, and the silica alumina ball became in the state of floating in the tube, the air flow rate was measured to obtain the amount of air (Q0) forming the terminal settling velocity (u). Incidentally, such an amount of air can be measured by, for example, any of the following methods. (a) In a case where the amount of air flowing from the lower end opening portion of the tube is small at the beginning, and the dropped silica alumina ball fall from the lower end opening of the tube, the amount of air is an amount of air at the time when the amount of air from the lower end opening side increases gradually, and the silica alumina ball do not drop from the lower end opening portion of the tube. (b) In a case where the flow rate of air flowing from the lower end opening portion of the tube is large at the beginning, and the dropped silica alumina ball pop out from the upper end opening portion of the stainless steel tube, the amount of air is an amount of air at the time when the amount of air from the lower end opening side decreases gradually, and the silica alumina ball do not pop out from the upper end opening portion of the tube. (c) When the silica alumina ball is dropped into the tube, in a case where the silica alumina ball does not drop from the lower end opening portion of the tube and does not pop out from the upper end opening portion, the amount of air at that time is adopted. The above work was carried out five times, and the average value was used as the amount of air (Q0) forming the terminal settling velocity (u) in the tube of the silica alumina ball.

<Conditions for Unloading Work>

A stainless steel tube with an inner diameter of 25 mm and a length of 6500 mm was installed vertically as the tubular body 510, and a stainless steel wire mesh was attached to the lower end of the tube to support the solid matter filled in the tube from dropping from the lower portion of the tube. After the tube was filled with silica alumina ball having a diameter of 6 mm such that the height of the packing layer was 6000 mm, the unloading work was carried out under the conditions described below.

(1) Air was used as the discharge gas.

(2) A nylon tube with an outer diameter of 6 mm and an inner diameter of 4.5 mm was used as the conduit 200.

(3) The dimensions of each portion of the nozzle 100 are as follows. The length in the longitudinal direction is 40 mm, the diameter of the base end opening portion 121 and the diameter of the second portion 142 of the flow path 140 are both 4 mm, the outer diameter of the body portion 130 of the flow path 140 is 5 mm, and the cross-sectional shape of the body portion 130 is circular.

(4) The material of the nozzle 100 is SUS304.

(5) The nozzle 100 was provided with one tip opening portion 111 and six side holes 10 mm from the tip opening portion in the circumferential direction on the base end side. The opening shapes of the tip opening portion 111 and the side holes are both circular. In Table 1, d1 is the diameter of the tip opening portion 111, and d2 is the diameter of each side hole.

(6) When the solid matter was unloaded, air was introduced into the nozzle 100 at 25.0 m³/Hr(Q1). Incidentally, with nozzle numbers 1 to 10, Table 1 shows that the specifications of the nozzle 100 other than the above (3) and (4) are changed. Further, the values of Q1a/Q1b when air is introduced into each nozzle at 25.0 m³/Hr(Q1) are shown in Tables 1 and 2. Here, *1 to *2 shown in Table 1 mean that the specifications are as follows.

1: In the nozzle (the nozzle in which the angle θ1 of each side hole in the circumferential direction of the flow path is 60°) illustrated in FIG. 3, the angle θ2 of the side holes 151, 153, and 155 illustrated in FIG. 6 is 45°, and the angle θ2 of the side holes 152, 154, and 156 illustrated in FIG. 6 is 60°.

2: A rod made of SUS304 with a diameter of 1.5 mm and a length of 20 mm was welded to the tip of the nozzle as the impact force applying member 330 (see FIG. 14).

(7) When the solid matter was unloaded, the inside of the stainless steel tube was sucked at a predetermined suction amount Q2 by using the pipe 320 and the suction machine 420 (see FIGS. 8 and 9) arranged on the upper end opening portion side of the stainless steel tube. The suction amount Q2 was adjusted such that Q2/Q0 becomes as shown in Table 2. Incidentally, the amount of air (Q0) capable of achieving the terminal settling velocity (u) of the ceramic balls in the stainless steel tube was 39 m³/Hr.

Example 1

As the nozzle 100, nozzle number 1 shown in Table 1 was used. While the tip of the nozzle 100 connected to the conduit 200 was gradually inserted from the upper end opening portion 511 of the tubular body 510 toward the lower portion of the tubular body 510, a suction force was generated in the inside 513 of the tubular body 510 to unload all the ceramic balls filled in the inside 513 of the tubular body 510. This unloading work was carried out on a total of ten tubular bodies 510. In the work of unloading the ceramic balls from the ten tubular bodies 510, a total of 12 times of secondary blockages occurred. The average time required for unloading was 40 seconds.

Examples 2 to 6

Examples 2 to 6 were the same as in Example 1 except that the types of the nozzles 100 are changed to those of nozzle numbers 2 to 6 shown in Table 1, and the unloading work was carried out on ten tubular bodies 510 filled with ceramic balls. The number of occurrences of secondary blockage which occurred during the unloading work and the average time required for unloading are shown in Table 2.

Examples 7 to 10

In Examples 7 to 10, the types of the nozzles 100 were changed to those of nozzle numbers 7 to 10 shown in Table 1, and Q1/Q2 and Q2/Q0 were changed as shown in Table 2. Other conditions were the same as in Example 1, and the unloading work was carried out on ten tubular bodies 510 filled with ceramic balls. The number of occurrences of secondary blockage which occurred during the unloading work and the average time required for unloading are shown in Table 2.

Example 11

In Example 11, the nozzle 100 having the same nozzle number 9 as in Example 9 was used, Q1/Q2 and Q2/Q0 were changed as shown in Table 2, and a piano wire (4 mm×2 mm square, a length of 7000 mm) was inserted from the upper end side of the tubular body 510 as the impact force applying member 310 (see FIG. 11) to apply an impact force to the ceramic balls. Other conditions were the same as in Example 1, and unloading was performed on ten tubular bodies 510 filled with ceramic balls. The number of occurrences of secondary blockage during the unloading work and the average time required for unloading are shown in Table 2.

TABLE 1

| NOZZLE NUMBER | d1 (mm) | d2 (mm) | θ1 (°) | θ2 (°) | Q1a/Q1b |
|---|---|---|---|---|---|
| 1 | 3.0 | 1.4 | 60 | 45 | 0.77 |
| 2 | 3.0 | 1.5 | 60 | 45 | 0.67 |
| 3 | 2.0 | 1.5 | 60 | 45 | 0.30 |
| 4 | 1.5 | 1.5 | 60 | 45 | 0.17 |
| 5 | 1.5 | 2.4 | 60 | 45 | 0.07 |
| 6 | 1.0 | 2.0 | 60 | 45 | 0.04 |
| 7 | 1.5 | 1.0 | 60 | 45 | 0.38 |
| 8 | 1.0 | 1.6 | 60 | 45 | 0.07 |
| 9 | 1.5 | 1.0 | 60 | 45&60 (*1) | 0.38 |
| 10 (*2) | 1.5 | 1.5 | 60 | 45&60 (*1) | 0.17 | flow rate (Q1b) of the gas discharged from one or more side holes is 0.05 to 0.7, it is possible to quickly unload the solid matter from the tubular body 510 while suppressing the occurrence of secondary blockage in the inside 513 of the tubular body 510. Further, from Examples 10 and 11, it is confirmed that the time for unloading the solid matter can be shortened by using the impact force applying members 310 and 330.

Hereinbefore, the nozzle, the solid matter unloading device, the solid matter unloading system, and the solid matter unloading method according to the present invention have been described through the embodiments and examples. However, the nozzle, the solid matter unloading device, and the solid matter unloading system, and the solid matter unloading method according to the present invention are not limited to the contents described in the specification and can be appropriately changed on the basis of the description of the claims.

This application is based on Japanese Patent Application No. 2019-011467 filed on Jan. 25, 2019, the disclosure content of which is incorporated by reference in its entirety.

REFERENCE SIGNS LIST

1: solid matter unloading system
10: solid matter unloading device
100: nozzle
110: tip portion of nozzle
111: tip opening portion of nozzle
120: base end portion of nozzle
121: base end opening portion of nozzle
130: body portion of nozzle
140: flow path of nozzle
151: first side hole (side hole)
152: second side hole (side hole)
153: third side hole (side hole)
154: fourth side hole (side hole)
155: fifth side hole (side hole)
156: sixth side hole (side hole)
200: conduit
215: flow path of conduit
250: relay tube
251: connecting portion
310, 330: impact force applying member
320: pipe

TABLE 2

| EXAMPLE | NOZZLE NUMBER | Q1a/Q1b | Q1/Q2 | Q2/Q0 | AVERAGE TIME (SECONDS) REQUIRED FOR UNLOADING | THE NUMBER OF OCCURRENCES OF SECONDARY BLOCKAGE |
|---|---|---|---|---|---|---|
| EXAMPLE 1 | 1 | 0.77 | 0.61 | 1.05 | 40 | 12 |
| EXAMPLE 2 | 2 | 0.67 | 0.61 | 1.05 | 38 | 5 |
| EXAMPLE 3 | 3 | 0.30 | 0.61 | 1.05 | 30 | 3 |
| EXAMPLE 4 | 4 | 0.17 | 0.61 | 1.05 | 26 | 1 |
| EXAMPLE 5 | 5 | 0.07 | 0.61 | 1.05 | 26 | 0 |
| EXAMPLE 6 | 6 | 0.04 | 0.61 | 1.05 | 58 | 1 |
| EXAMPLE 7 | 7 | 0.38 | 0.58 | 1.11 | 27 | 0 |
| EXAMPLE 8 | 8 | 0.07 | 0.58 | 1.11 | 30 | 0 |
| EXAMPLE 9 | 9 | 0.38 | 0.58 | 1.11 | 36 | 3 |
| EXAMPLE 10 | 10 | 0.17 | 0.58 | 1.11 | 40 | 1 |
| EXAMPLE 11 | 9 | 0.38 | 0.52 | 1.23 | 22 | 0 |

From the results shown in Table 2, it is confirmed that when the ratio (Q1a/Q1b) of the flow rate (Q1a) of the gas discharged from one or more tip opening portions and the 410: gas supply machine
420: suction machine
500: reactor 510: tubular body
511: upper end opening portion of tubular body
513; inside of tubular body
M1, M2: solid matter

The invention claimed is:

1. A nozzle which is connectable to a conduit for supplying gas to a tubular body filled with granular solid matters, the nozzle comprising:
    a flow path which allows the gas to flow;
    one or more tip opening portions which are formed on a tip side of the flow path;
    a base end opening portion which is formed on a base end side of the flow path; and
    one or more side holes which are formed on the base end side from the one or more tip opening portions and allow a part of the gas flowing through the flow path to be discharged toward the base end side, wherein
    the one or more tip opening portions are formed in a direction of the flow path,
    the one or more side holes are formed along a circumferential direction of the flow path,
    when the gas is supplied from the base end opening portion, a ratio (Q1a/Q1b) of a flow rate (Q1a) of the gas discharged from the one or more tip opening portions and a flow rate (Q1b) of the gas discharged from the one or more side holes is 0.05 to 0.7, and
    each diameter of the one or more side holes is 1.0 to 2.4 mm.

2. The nozzle according to claim 1, wherein
    the one or more side holes are open toward a base end side of the nozzle at an angle of 30° or more and less than 90° with respect to an axis along a longitudinal direction of the flow path.

3. The nozzle according to claim 1, wherein
    the one or more side holes comprise two or more holes formed at equal intervals from each other along a circumferential direction of the flow path.

4. A solid matter unloading device comprising:
    the nozzle according to claim 1; and
    the conduit to which the nozzle is connected.

5. The solid matter unloading device according to claim 4, wherein
    the conduit is configured to be capable of transmitting a pushing force applied toward the tip side of the nozzle to the solid matters filled in the tubular body.

6. The solid matter unloading device according to claim 5, wherein
    the conduit has a plurality of relay tubes which are divided along an extending direction of the conduit and has predetermined rigidity, and a connecting portion which connects the adjacent relay tubes to each other.

7. The solid matter unloading device according to claim 4, the device further comprising:
    an impact force applying member which is configured to be insertable into the tubular body and applies an impact force to the solid matters filled in the tubular body.

8. A solid matter unloading system comprising:
    the solid matter unloading device according to claim 4;
    a gas supply machine which supplies the gas into the tubular body through the conduit and the nozzle; and
    a suction machine which generates a suction force inside the tubular body and moves the solid matters to an outside of the tubular body.

9. A solid matter unloading method which unloads granular solid matters to an outside of a tubular body by generating a suction force inside the tubular body while supplying gas to the tubular body filled with the solid matters through a nozzle connected to a conduit, wherein
    the gas supply includes discharging the gas from one or more side holes formed in the nozzle along a circumferential direction of the nozzle toward a base end side of the nozzle while discharging the gas from one or more tip opening portions formed in the nozzle in a direction of a flow path of the nozzle toward the solid matters filled in the tubular body,
    a ratio (Q1a/Q1b) of a flow rate (Q1a) of the gas discharged from the one or more tip opening portions and a flow rate (Q1b) of the gas discharged from the one or more side holes is 0.05 to 0.7, and
    each diameter of the one or more side holes is 1.0 to 2.4 mm.

10. The solid matter unloading method according to claim 9, wherein
    a ratio (Q1/Q2) of a total discharge amount (Q1) per unit time of the gas discharged from the one or more tip opening portions and the one or more side holes and a suction amount (Q2) per unit time of sucking an inside of the tubular body is 1 or less.

11. The solid matter unloading method according to claim 9, wherein
    different types of the solid matters are filled in layers inside the tubular body.

12. The solid matter unloading method according to claim 9, the method further comprising:
    applying an impact force to the solid matters filled inside the tubular body.

* * * * *